April 27, 1937.　　C. H. WHITLOCK　　2,078,432
CAMERA
Original Filed Dec. 8, 1933　　2 Sheets-Sheet 2
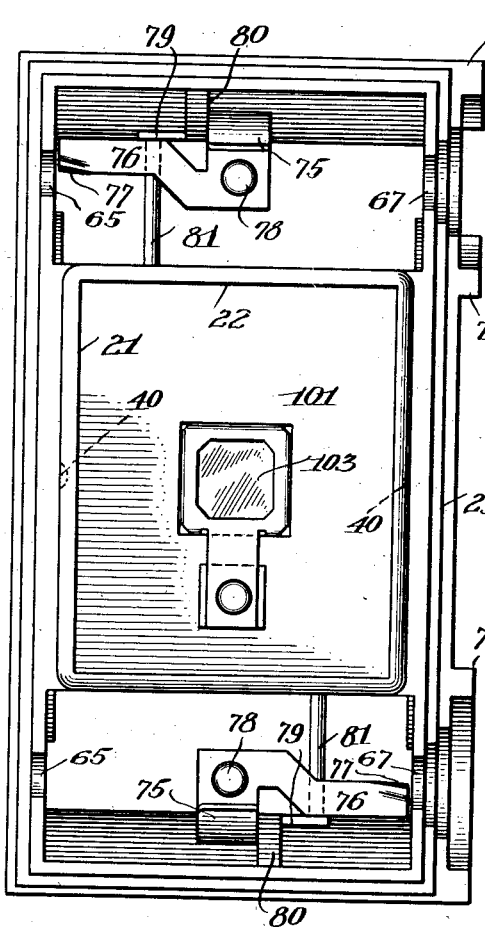
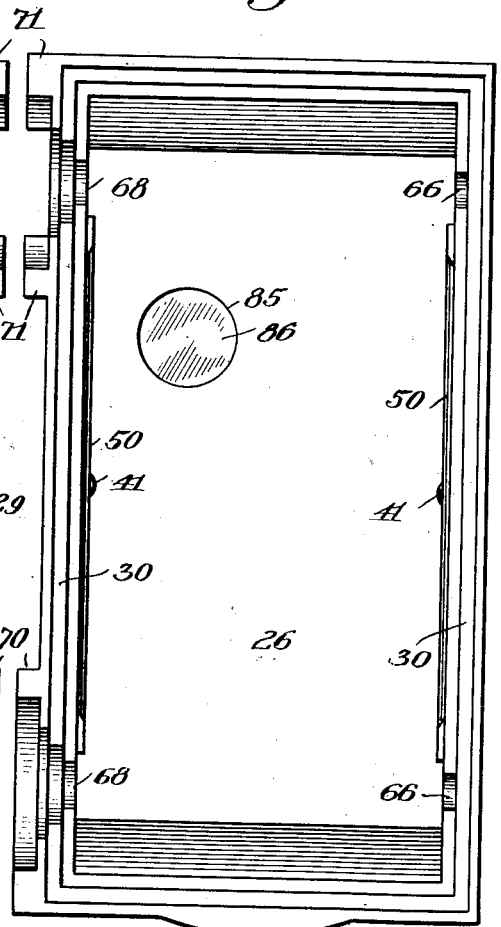
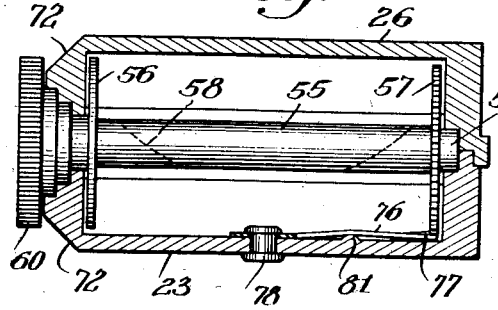
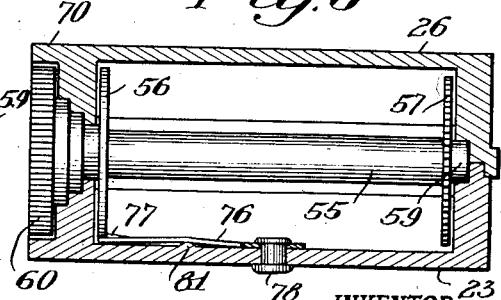
INVENTOR
Carl H. Whitlock
BY Edward H. Cumpston
his ATTORNEY Patented Apr. 27, 1937

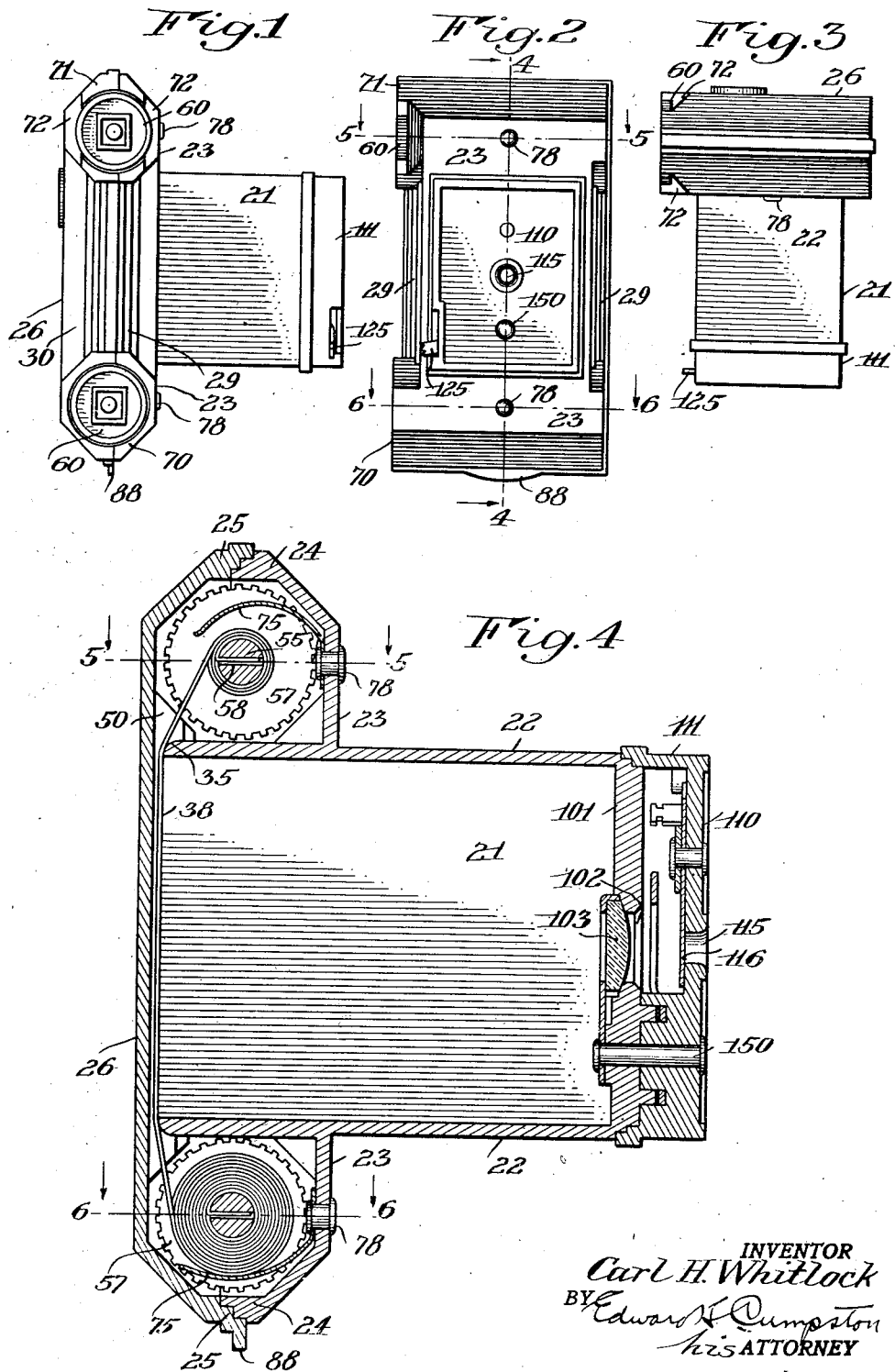

2,078,432

UNITED STATES PATENT OFFICE 2,078,432

CAMERA

Carl H. Whitlock, Lockport, N. Y., assignor, by mesne assignments, to Universal Camera Corporation, New York, N. Y., a corporation of New York Original application December 8, 1933, Serial No. 701,488. Divided and this application August 23, 1934, Serial No. 741,113

6 Claims. (Cl. 242—71)

This invention relates to the construction of photographic cameras, and has for one object the provision of an improved film spool of novel form.

Another object is the provision of improved film winding means of simple and effective form.

A further object is the provision of a generally improved and more satisfactory camera.

A still further object is the provision of various improvements in details which are especially useful in cameras of small size of the so-called "snapshot" variety for amateur use.

To these and other ends the invention resides in certain improvements and combinations of parts, all as will be hereinafter more fully described, the novel features being pointed out in the claims at the end of the specification.

In the drawings:

Fig. 1 is a side view of a camera constructed according to a preferred embodiment of the invention;

Fig. 2 is a front view thereof;

Fig. 3 is a top view thereof;

Fig. 4 is a longitudinal vertical section taken substantially centrally through the camera;

Fig. 5 is a section substantially on the line 5—5 of Figs. 2 and 4;

Fig. 6 is a section substantially on the line 6—6 of Figs. 2 and 4;

Fig. 7 is a rear view of the camera with the back cover removed, and

Fig. 8 is an interior view of the back cover removed from the camera.

The same reference numerals throughout the several views indicate the same parts.

This application is a division of my co-pending application for patent on Camera, Serial No. 701,488, filed December 8, 1933. Various features shown but not claimed in the present application are claimed in said parent case and in other divisions thereof.

According to the present invention there is provided a camera mainly of molded material (such as "Bakelite", for example) which, in the present instance, is embodied in a hand camera of the non-collapsible type; that is, a camera of substantially rigid construction which does not fold up.

The camera comprises a body of generally rectangular shape including side walls 21 and top and bottom walls 22 forming a dark chamber or exposure chamber. It will be understood that the terms "top" and "bottom" and similar expressions used in this specification and in the accompanying claims are employed merely for convenience of description, for obviously pictures may be taken with the camera turned upside down or on its side, so that what is here described as the top may become the side or bottom of the camera, and vice versa.

At an intermediate point on each of the top and bottom walls 22 are outwardly extending walls 23 which extend upwardly from the top wall and downwardly from the bottom wall and thence rearwardly to form chambers for receiving film spools. It will be noted that these walls 23 are at a point materially rearwardly of the front end of the body formed by the walls 21 and 22, so that this body in effect forms an extension of substantially rectangular outline extending for a material distance forwardly from the plane of the spool chambers.

The walls 23 terminate at rear edges 24 for contact with front edges 25 of a back or cover member 26. Preferably the edges 24 and 25 are each stepped or formed with a plurality of offset angular shoulders, interengaging with each other as plainly shown in the drawings, for the purpose of forming a tight-light seal for preventing entrance of light at the joint between the parts.

The side walls 21 of the body have thickened portions or outwardly extending flanges 29 running exteriorly along each side at their rear edges, which flanges are likewise of stepped construction to cooperate with and form a tight light seal with similar complementary steps on the front edges of side flanges 30 formed on the back cover 26.

It will be noted from Fig. 4 that the side walls 21 and top and bottom walls 22 of the camera body extend rearwardly to a plane behind the plane of separation of the back 26 from the body. These walls 21 and 22 terminate in smooth rear edges all lying in a common plane which is the focal plane of the camera, these rear edges being rounded as indicated at 35, so that film may slide easily over the edges. It will be seen that the side flanges 30 of the back 26 lie outside of the side walls 21 of the body and the main rear wall of the back 26 itself lies slightly rearwardly of the rear edges of the walls 21 and 22, to provide a space for receiving and guiding the film shown at 38.

The walls 21, 22, and 23 are preferably all formed integrally as a single unitary molded article. The back member 26 with its forwardly extending flanges is preferably also formed of a single piece of molded material, and the side flanges 30 of the back closely embrace the outer surfaces of the side walls 21 of the body, to hold the back frictionally in position on the body. To assist in holding the parts, one of the elements is provided with indentations, such as the indentations 40 (Fig. 7) formed in the side walls 21, and the other of the separable elements is formed with cooperating projections, such as the projections 41 (Fig. 8) formed on the inner surfaces of the side flanges 30 of the back. The molded material of which the back is made is sufficiently resilient so that the side flanges will give a little bit, allowing the projections 41 to snap into the indentations 40 when the parts are closed, and permitting the projections 41 to pull out of the indentations 40 when the back cover is opened.

On the inner face of each side flange 30 is preferably a thickened portion or shoulder 50, best shown in Fig. 8, of less width than the side flanges, extending a little beyond the top and bottom walls 22 of the body when the back member is in normal closed position on the body. These shoulders 50 on the side flanges of the back form lateral guides for the edges of the film 30 and hold the film against sidewise displacement, while the film is held against displacement out of the focal plane by the fact that its front surface is engaged with the rear edges of the walls 21 and 22 on all four sides, and is held against them by the back 20. The rear edges of the walls 21 and 22 form in effect a screen or mask defining the exposure area of the film.

The film spools used in the present camera are preferably of novel construction, and, as shown especially in Figs. 4 and 5, each spool comprises a stem 55 and a pair of disks 56 and 57 attached to the stem and spaced from each other for receiving the film between them in known manner. The stem 55, between the two disks, may have a slot 58 formed therein through which one end of the film may be tucked. One end of the stem 55 may project beyond the disk 57 as at 59 and the other end of the stem projects beyond the disk 56 and carries a winding knob 60 fixed to the stem for use in turning the spool. The parts 55, 56, and 57 may conveniently be formed of metal and the knob 60 may be conveniently made of molded material similar to that from which the camera body is made, although, of course, other materials might be used. The inner side of the knob 60, or side toward the disk 56, is of stepped formation as clearly shown in Fig. 5, for the purpose of forming a light seal with the camera body as will be explained below.

The left hand side walls of the spool chambers at their rear edges, are provided with suitable notches 65 (Fig. 7) one at the end of each spool chamber, which notches are of proper size to receive the projecting ends 59 of the spool stems but which do not extend all the way through the wall. The corresponding side wall 30 of the back 20 is provided with cooperating notches 66 (Fig. 8) so that when the back is in place on the camera body, the notches 65 and 66 form between them bearings for the projecting ends 59 of the stems of spools placed in the respective spool chambers.

At the opposite end of each spool chamber, that is, at the right hand end of the chamber when the camera is viewed from the back as in Fig. 7, the side walls of the body are formed with apertures 67 somewhat similar to the notches 65, but these apertures extend all the way through the wall and are of stepped formation, increasing in diameter in an outward direction, as plainly shown in Fig. 7. Cooperating stepped apertures 68 are formed in the corresponding side walls 30 of the back 20. The steps of these apertures 67 and 68 correspond to and are complemental to the steps on the winding knobs 60 of the film spools, so that the steps of the knobs interlock with the steps of the camera body and back and provide an effective light seal as well illustrated in Figs. 5 and 6, in spite of the fact that the knob 60 of each spool is located exteriorly of the camera and is capable of turning relatively to the camera.

The film supply spool, which occupies the lower chamber when the camera is viewed as in Figs. 1 and 4, is not intended to be directly turned by hand but should turn to unwind film therefrom only as film is wound up on the upper or winding spool. Consequently, a wall or flange 70 is provided surrounding the turning knob 60 of the lower spool as best shown in Figs. 6, 7, and 8. This wall or flange 70 closely embraces the knob 60 on all sides and extends outwardly so that its outer edge is substantially flush with the outer edge of the knob. The knob 60 can turn freely in the cavity formed within the wall 70, but yet it can not be readily grasped and is substantially inaccessible to be directly turned by hand.

The upper or winding spool, however, should be readily accessible for turning in order to wind film to bring a fresh portion of film into the focal plane after each exposure. Accordingly, both the body and the back of the camera are provided around the winding knob 60 of the upper spool with walls or flanges 71 as best shown in Figs. 7 and 8, but these walls 71 do not completely encircle the knob 60. On the contrary, they are omitted or cut away on two opposite sides of the knob 60, preferably being beveled off as indicated at 72 in Fig. 5. Thus the edges of the knob 60 are freely exposed at two diametrically opposite points and the knob may be easily grasped between a person's thumb and first finger so that it can be readily turned for feeding the film.

It is desirable to provide an arrangement for preventing accidental retrograde movement of the film winding rolls and also to provide frictional resistance for the rolls so that the film will remain tightly wound on the winding roll and will not unroll too rapidly or too freely from the supply roll. To this end, the disk 57 on each film spool is preferably formed with teeth on its periphery as indicated in Figs. 4 and 5 of the drawings. Mounted in each spool chamber is a resilient member formed of a single piece of springy metal having two arms at an angle to each other, a curved spring arm 75 located near the middle of the spool chamber, and a pawl arm 76 extending from the arm 75 toward one end of the chamber. In each case, the arm 75 presses against the film on the spool, at least when any substantial amount of film is wound thereon, in the manner illustrated in Fig. 4, and tends to prevent loosening of the successive convolutions of film on each spool. The other arm 76 in the case of the upper or winding spool chamber, extends leftwardly to a point near the left hand end of the chamber as best shown in Fig. 8, and a bent up corner 77 at the left end of the arm 76 engages the teeth on the periphery of the disk 57 (as shown in Fig. 5) in such manner as to allow these teeth to move past the edge 77 in one direction, but not in the opposite direction. Thus the arm 76 acts as a pawl permitting the winding spool to be rotated in a clockwise or winding direction when viewed as in Fig. 4, but prevents it from turning in the opposite direction.

In the case of the lower chamber for receiving the supply spool, the parts 75 and 76 may be identical, but are turned upside down as plainly indicated in Fig. 7 so that the arm 76 extends toward the right hand end instead of toward the left hand end of the spool chamber. The extreme end of the arm this time engages the smooth periphery of the disk 56 of the film supply spool and does not prevent rotation of the spool but produces frictional resistance which steadies the spool and prevents it from unwinding too rapidly.

Each of these metallic members 75, 76 is preferably fastened in its respective spool chamber by a single rivet 78 passing through the metallic member approximately where the arm 76 joins the arm 75, and through the adjacent wall of the camera body, as shown particularly in Figs. 4 and 7. Molded integrally on the adjacent wall of the body in each spool chamber is a lug 79 for engaging one side of the arm 76 and a lug 80 for engaging one side of the arm 75. The lug 79 prevents each metallic member from rotating in a clockwise direction about its single rivet 78 while the lug 80 similarly prevents rotation in a counterclockwise direction, so that the single rivet passing through the metallic member at one point is sufficient to hold this member solidly in place.

Each spool chamber may also be provided with a ridge or lug 81 molded in the bottom of the chamber and located at a point between the rivet 78 and the free end of the arm 76, as shown in Figs. 5, 6, and 7, to hold the free end of the arm 76 elevated above the adjacent wall of the spool chamber to allow some freedom of movement in order that the end of the arm may have the desired spring action.

The back 26 is provided with an opening 85 in which is placed a sheet 86 of transparent material so colored as to exclude actinic light. For example, the sheet 86 may be a piece of dark red celluloid, which forms a window through which the user of the camera may observe numbers on the film, to guide him in winding the film after each exposure.

At the lower edge of the back 26 there may be provided a slight protuberance 88 (Figs. 1 and 8) which may be readily grasped in order to pull the back or cover loose from the body of the camera. When the back has been removed, the spool of exposed film is removed from the upper spool chamber by simply lifting the spool out of the chamber, the empty spool is shifted from the lower chamber to the upper chamber, and a new supply roll of film is put in the lower chamber and the end of the film threaded over the rear edges of the walls 21 and 22 to the upper spool, as in Fig. 4. Then the back is replaced on the camera, the winding knob 60 of the upper spool is grasped and turned until the first number appears through the window 86, and the camera is now ready to take an exposure.

The front end of the body portion formed by the walls 21 and 22 is substantially closed by a cross wall or transverse partition 101 which is preferably molded integrally with the walls 21 and 22, and which is provided with an aperture 102. A lens 103 is held in alinement with this aperture by any suitable means.

In front of the wall 101 and spaced somewhat forwardly therefrom is a separate front member or wall 110 having flanges 111 extending rearwardly around all four sides for contact with the camera body substantially at its front edges; that is, the edges formed between the transverse wall 101 and the walls 21 and 22.

In the space between the walls 101 and 110 is any suitable shutter mechanism, including, for example, a shutter blade 116 arranged to open and close an aperture 115 in the front 110 upon operation of an actuating lever 125. The front assembly is held together in any desired manner, as by the rivet 150.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A camera comprising walls forming a chamber for receiving a film spool having a disk adjacent one end, a resilient metallic member formed integrally of one piece having two portions at an angle to each other, one of said portions being curved for partially encircling a roll of film on said spool, the other of said portions extending generally lengthwise of said spool and having a free end forming a resilient arm for engaging said disk on said spool, and means fastening said metallic member to a wall of said chamber.

2. A camera comprising walls of molded material forming a chamber for receiving a film spool having a disk adjacent one end, a resilient metallic member secured to one of said walls intermediate the ends of said chamber and extending thence toward one end of the chamber to provide a free end for engaging the periphery of said disk, and a projection formed integrally of said molded material beneath said metallic member between the point at which said member is secured to said wall and the free end of said member, to assist in holding said free end of said member away from said wall so that said free end may form a resilient portion capable of flexing readily.

3. A camera comprising a body having means for holding two film spools and having two openings through each of which a portion of a film spool may project so that a portion of said spool may be located on the exterior of said body, means on said body surrounding the exteriorly located part of one of said spools sufficiently to render said part substantially inaccessible for turning, and means only partly surrounding the exteriorly located part of the other spool while leaving said part sufficiently accessible to be readily turned by hand.

4. A camera comprising a body having an internal chamber for receiving the major portion of a film spool, an external recess for receiving a winding knob fixed to and forming a part of the film spool, and an opening between said chamber and said recess through which a part of said spool may extend, said opening being of materially smaller diameter than said recess and said chamber.

5. The combination with a film spool including two spaced flanges for receiving a roll of film between them and a winding knob spaced axially from one of said flanges, of a camera comprising a body having an internal chamber for receiving said flanges and an external recess for receiving said winding knob, the sides of said recess being cut away at two opposite sides of said knob to render said knob readily accessible to be turned by hand.

6. In combination, a camera, a film supply spool and a film rewinding spool, a winding knob attached to each of said spools, said camera comprising means forming a chamber for receiving said film supply spool, means forming a chamber for receiving said film rewinding spool, a winding knob of each spool being located outside of its chamber and externally of the camera, means closely surrounding the winding knob of said supply spool to render said knob relatively inaccessible for turning, and means whereby the knob of said rewinding spool is rendered readily accessible for turning.

CARL H. WHITLOCK.